(12) United States Patent  
Onogi et al.

(10) Patent No.: US 8,856,273 B2  
(45) Date of Patent: *Oct. 7, 2014

(54) INFORMATION PROCESSING DEVICE AND INFORMATION PROCESSING METHOD FOR COMMUNICATION WITH AN EXTERNAL DEVICE VIA A NETWORK

(75) Inventors: Ken Onogi, Tokyo (JP); Shinsuke Noguchi, Kanagawa (JP); Yusuke Sakai, Kanagawa (JP)

(73) Assignee: Sony Corporation (JP)

(*) Notice: Subject to any disclaimer, the term of this patent is extended or adjusted under 35 U.S.C. 154(b) by 287 days.

This patent is subject to a terminal disclaimer.

(21) Appl. No.: 13/422,422

(22) Filed: Mar. 16, 2012

(65) Prior Publication Data

US 2012/0179781 A1    Jul. 12, 2012

Related U.S. Application Data

(63) Continuation of application No. 12/291,470, filed on Nov. 10, 2008, now Pat. No. 8,156,196.

(30) Foreign Application Priority Data

Nov. 22, 2007 (JP) .............................. P2007-303638

(51) Int. Cl.
*G06F 15/16* (2006.01)
*H04L 12/28* (2006.01)
*H04L 29/08* (2006.01)

(52) U.S. Cl.
CPC ............ *H04L 67/34* (2013.01); *H04L 12/2818* (2013.01); *H01L 12/2834* (2013.01); *H04L 12/2809* (2013.01)
USPC ............ 709/217; 709/219; 709/223; 717/178

(58) Field of Classification Search
CPC ............ H04L 12/2803; H04L 12/2809; H04L 12/2818
See application file for complete search history.

(56) References Cited

U.S. PATENT DOCUMENTS 6,996,555 B2    2/2006  Muto et al.
8,635,300 B2*   1/2014  Kvache et al. ................ 709/217

(Continued)

FOREIGN PATENT DOCUMENTS

JP      2006-319960 A    11/2006
JP      2007133796 A      5/2007
WO      2005066808 A1     7/2005

OTHER PUBLICATIONS

Office Action from Japanese Application No. 2007-303638, dated Nov. 8, 2011.

*Primary Examiner* — Andy Ho
(74) *Attorney, Agent, or Firm* — Lerner, David, Littenberg, Krumholz & Mentlik, LLP

(57) ABSTRACT

An information processing device capable of communicating with an external device connected thereto via a network and includes an application acquisition unit that obtains an application program to be used to control a function of the external device from an application distribution device present on the network, an external device search unit that searches for external devices on the network and an application execution unit that controls the function of the external device by executing the obtained application program, is provided. The application program obtained by the application acquisition unit includes a function of searching for the external device via the external device search unit, which executes an external device search in response to a request issued from the application execution unit executing the application program.

2 Claims, 7 Drawing Sheets

(56) References Cited

U.S. PATENT DOCUMENTS

| | | |
|---|---|---|
| 2002/0141761 A1 | 10/2002 | Kondo |
| 2006/0168178 A1* | 7/2006 | Hwang et al. ................ 709/223 |
| 2007/0027967 A1 | 2/2007 | Hatayama et al. |
| 2007/0211691 A1 | 9/2007 | Barber et al. |
| 2008/0178224 A1 | 7/2008 | Laude et al. |
| 2008/0209034 A1 | 8/2008 | Shin et al. |
| 2010/0169413 A1* | 7/2010 | Kim et al. .................... 709/203 |
| 2011/0182205 A1* | 7/2011 | Gerdes et al. ................ 370/254 |

* cited by examiner

INFORMATION PROCESSING DEVICE AND INFORMATION PROCESSING METHOD FOR COMMUNICATION WITH AN EXTERNAL DEVICE VIA A NETWORK

CROSS-REFERENCE TO RELATED APPLICATION

The present application is a continuation of U.S. patent application Ser. No. 12/291,470, filed on Nov. 10, 2008 and issued as U.S. Pat. No. 8,156,196, which claims priority from Japanese Patent Application No. JP 2007-303638, filed in the Japanese Patent Office on Nov. 22, 2007, all of which are incorporated herein by reference.

BACKGROUND OF THE INVENTION

1. Field of the Invention

The present invention relates to an information processing device and an information processing method.

2. Description of the Related Art

Various systems enabling linked operation of a plurality of devices connected to a home network installed within a private residence or remote control of the devices have been proposed. For instance, a telephone connected to a telephone network and a television set may be linked and automatic control such as automatically reducing the volume at the television set whenever there is an incoming call on the telephone, may be executed in such a system.

Japanese Laid Open Patent Publication No. 2006-319960 discloses a system in which device linkage within a home network is achieved based upon device information with regard to the devices to be engaged in linked operation and linkage control information held in a home server connected to the home network. The home server in this system stores information related to the individual devices and information indicating contents of an operation that can be realized through linkage of at least two devices and device linkage is achieved by correlating the devices connected to the home network based upon the information held at the home server.

There is a device linkage method known in the related art through which linkage is achieved based upon information held at each device to be used to link with other devices without requiring a server for purposes of linkage. Through such device linkage technologies in the related art, device linkage is invariably achieved by equipping the individual devices with standardized functions supporting the full scope of the device linkage, from detection of a linkage partner device through control of the partner device.
(Patent reference literature 1)

SUMMARY OF THE INVENTION

However, a system that requires a home server in order to achieve device linkage, such as that disclosed in Japanese Laid Open Patent Publication No. 2006-319960 cannot achieve device linkage in an environment where a home server cannot be installed or if the home server does not have information related to linkage target devices.

In a system in which devices each independently link with another device, the individual devices are each equipped with a standardized communication unit, a standardized control unit and the like to be used for purposes of linkage. This means that as soon as a new standard is adopted and comes into effect, existing devices become obsolete, unable to support the new standard. Thus, if a given linkage partner device is, for instance, replaced with a newer model adopting the new standard, the new device cannot be linked with existing devices that do not have information related to it unless a special system is provided through which information in the existing devices can be updated.

Accordingly, the present invention having been completed by addressing the issues discussed above, provides a new and improved information processing device and a new and improved information processing method with which device linkage is achieved between devices that do not have a relationship of interdependency.

According to an embodiment of the present invention, there is provided an information processing device capable of communicating with an external device connected thereto via a network, including an application acquisition unit that obtains an application program to be used to control a function of the external device from an application distribution device present on the network, an external device search unit that searches for external devices on the network and an application execution unit that controls the function of the external device by executing the application program obtained by the application acquisition unit. The application program obtained by the application acquisition unit includes a function of searching for the external device via the external device search unit, which executes the external device search in response to a request issued from the application execution unit executing the application program.

The structure described above eliminates the need to pre-install communication units and control units, to be used to achieve device linkage, in individual devices and makes it possible to provide the user with a linking system supporting the latest functions at all times. In addition, since the device detection program itself can be provided from a server or the like, existing devices can be detected even after a new standard is adopted and brought into effect.

The application acquisition unit may obtain a search application program to be used to search for external devices and, in such a case, the external device search unit may execute the external device search in response to a request issued from the application execution unit executing the search application program. The user downloading the device search application program from the server or the like is able to select a specific device search method suiting the particular needs of the user in this manner and thus, a device search customized to meet the user's needs, is enabled.

The information processing device may further includes an application list acquisition unit that obtains from the application distribution device a list of application programs that can be executed by the application execution unit. In such a case, the application acquisition unit may obtain an application program selected by the user from the list. The user of such an information processing device is able to select a specific application program based upon information indicating available application programs offered by the server or the like.

In addition, the application list acquisition unit may obtain a list of application programs corresponding to an external device found through the search executed by the external device search unit. In this case, the user, having obtained information related to a device available for use, is then able to obtain information indicating the application programs corresponding to the found device. As a result, better convenience is assured since the need for a search for application programs corresponding to the device owned by the user is eliminated.

The external device search unit may search for an external device present on the network that corresponds to an application program selected by the user from the application list. In this case, only devices that can be engaged in linked processing based upon the application program specified by the user are listed, and the user does not need to specify in advance an external device corresponding to the function he wishes to engage. In other words, the user does not need to know in advance which specific device supports the function he wishes to engage.

The external device search unit may search for external devices present on the network that correspond to an application program currently being executed by the application execution unit and the application execution unit may control functions of an external device selected by the user, among the external devices found through the search by the external device search unit, by communicating with the selected external device. As an application program to be used to control an external device is selected at this information processing device, external devices corresponding to a specific function of the application program can be automatically searched through execution of the application program.

According to another embodiment of the present invention, there is provided an information processing method to be adopted in an information processing device capable of communicating with an external device connected thereto via a network, which includes an application acquisition unit that obtains an application program to be used to control a function of the external device from an application distribution device present on the network, an external device search unit that searches for external devices on the network and an application execution unit that controls the function of the external device by executing the application program obtained by the application acquisition unit. The information processing method includes a step in which the application acquisition unit obtains an application program that includes a function of searching for an external device via the external device search unit, a step in which the external device search unit executes a search for an external device in response to a request from the application execution unit executing the application program having been obtained, a step in which the application acquisition unit obtains from the application distribution device an application program to be used to control a function of the external device found through the search and a step in which the application execution unit controls the function of the external device found through the search executed by the external device search unit by executing the obtained application program.

The structure described above eliminates the need to pre-install communication units and control units, to be used to achieve device linkage, in individual devices and makes it possible to provide the user with a linking system supporting the latest functions at all times. In addition, since the device detection program itself can be provided from a server or the like, existing devices can be detected even after a new standard is adopted and brought into effect.

According to the embodiments of the present invention described above, device linkage is achieved between devices without requiring the devices to assume a relationship of dependency.

DETAILED DESCRIPTION OF THE PREFERRED EMBODIMENTS

Figure 1:
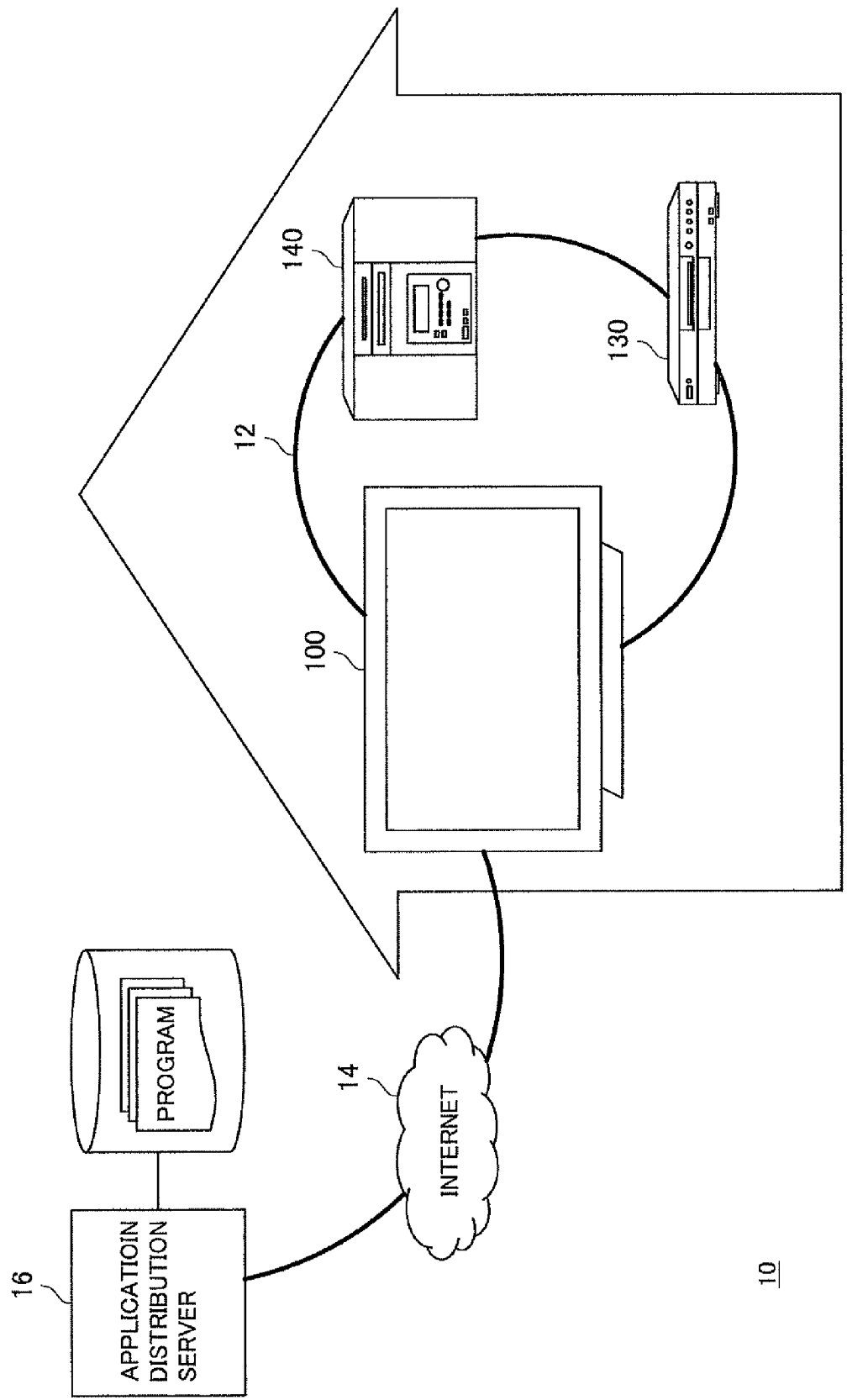
FIG. 1 schematically illustrates a CE device linkage system that includes an image receiver embodying the information processing device according to the present invention.

First, in reference to FIG. 1, a CE (consumer electronics) device linkage system that includes the information processing device achieved in an embodiment of the present invention is described. In the explanation provided below, the information processing device, which executes linked processing, is embodied as an image receiver. FIG. 1 schematically illustrates the structure of a CE device linkage system 10 that includes an television tuner 100 embodying the information processing device according to the present invention.

Via the CE device linkage system 10, devices such as an AV device, a smart home appliance, a personal computer and the like, connected to a home network (home LAN) 12 installed in a residential home or the like, are linked with one another and are engaged in linked operation. As shown in FIG. 1, the CE device linkage system 10 is made up with a plurality of CE devices including the television tuner 100, a digital recorder 130 and an audio device 140. The digital recorder 130 and the audio device 140 each operate as an external device in relation to the television tuner 100 embodying the information processing device.

Through the device linkage achieved in the CE device linkage system 10 in the embodiment, control is executed so that as a given device is operated, a specific function of another device is engaged, the state of another device is adjusted or the like. More specifically, as the television tuner 100, for instance, is operated, setting information at the digital recorder 130 may be modified or a recording function, a play function or the like of the digital recorder 130 may be controlled.

It is to be noted that while an image receiver embodies the information processing device according to the present invention in the description below, the present invention is not limited to this example and it may instead be adopted in a digital recorder, an audio device, a home game console, a camera, a video camera, a portable telephone or a personal computer.

Structure of the Television Tuner 100

First, the structure and functions of the television tuner 100 embodying the information processing device that executes linked processing are described.

The television tuner 100 outputs program contents broadcast from broadcasting stations, received via a reception antenna disposed outdoors or via an image distribution IP network. The television tuner 100, constituted with a display at which images are displayed and a speaker through which sound is output, converts the program contents data having been received to images and sound and outputs to the display and the speakers.

The television tuner 100 is connected with devices such as the digital recorder 130 via a home network 12. The television tuner 100 is capable of searching for a device connected in the home network 12 and directly communicating with the device found through the search via a UPnP (universal plug and play) system or a multicast DNS (domain name system) or the like. For instance, it is capable of obtaining the IP address of the digital recorder 130, obtaining information related to the functions of the digital recorder 130 and setting information indicating the settings selected at the digital recorder 130 and providing information related to its own functions, setting information indicating its own settings and the like to another device.

The television tuner 100, also connected to the Internet 14, has a function of downloading an application program from an application distribution server 16 present on the Internet 14 and executing the downloaded application program.

Figure 2:
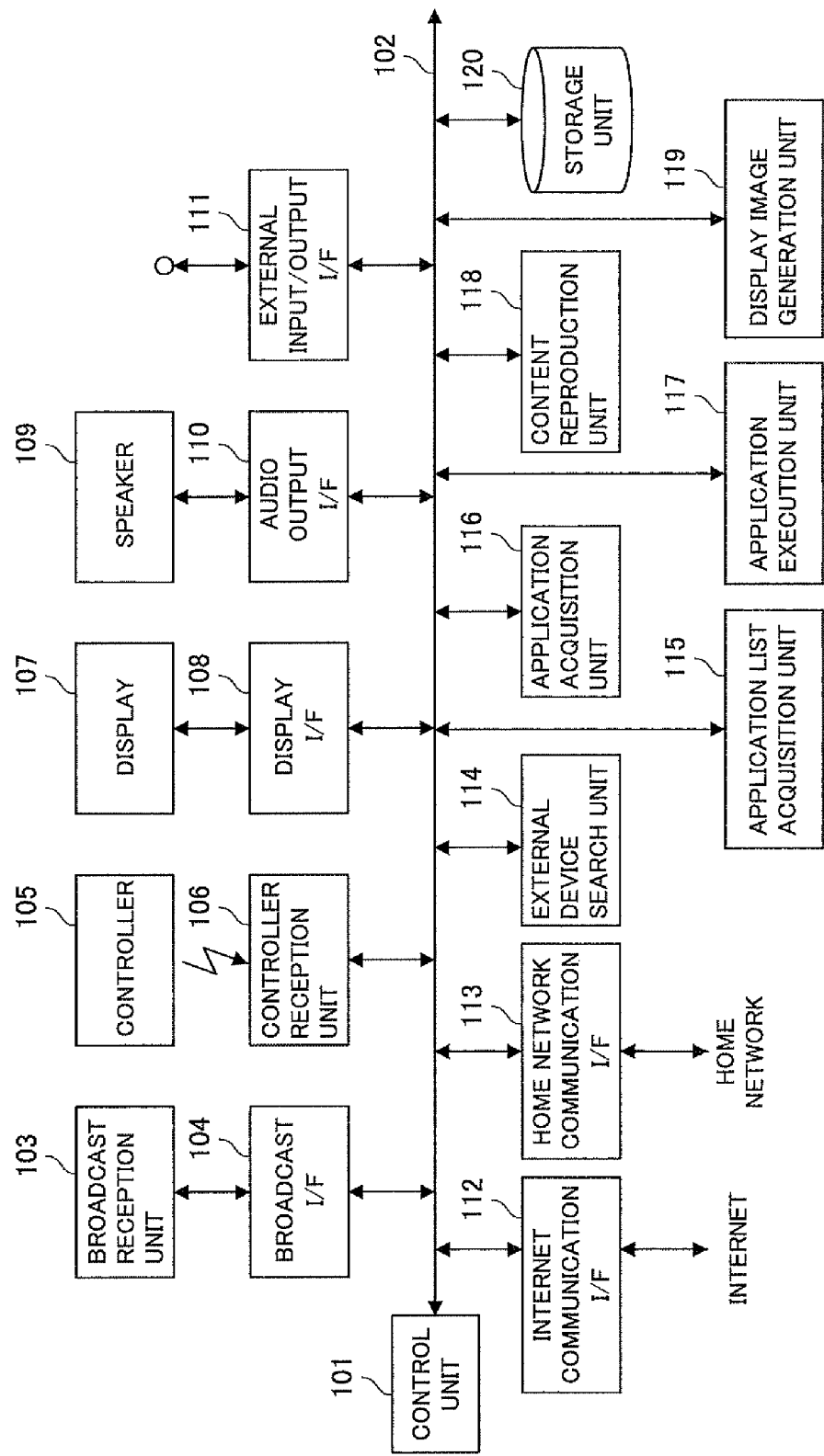
FIG. 2 is a block diagram schematically illustrating the image receiver embodying the information processing device.

Next, in reference to FIG. 2, the structure of the television tuner 100 is described. FIG. 2 is a block diagram schematically illustrating the structure adopted in the television tuner 100. As shown in FIG. 2, the television tuner 100 includes a control unit 101, a broadcast reception unit 103, a broadcast interface 104, a controller reception unit 106, a display 107, a display interface 108, a speaker 109, an audio output interface 110, an external input/output interface 111, an Internet communication interface 112, a home network communication interface 113, an external device search unit 114, an application list acquisition unit 115, an application acquisition unit 116, an application execution unit 117, a content reproduction unit 118, a display image generation unit 119 and a storage unit 120. The various units constituting the television tuner 100 are now individually described.

The control unit 101 is a functional unit that enables execution of various functions of the television tuner 100 by controlling individual functional units connected thereto via a bus 102. For instance, the control unit 101 executes control so as to generate a display image via the content reproduction unit 118 and the display image generation unit 119 based upon program content data received at the broadcast reception unit 103 and display the generated display image at the display 107. It also takes in a request signal received via the controller reception unit 106 and controls another functional unit so as to execute processing corresponding to the request signal.

The broadcast reception unit 103 receives program contents via a reception antenna or an image distribution IP network and outputs the program contents thus received to the connection bus 102 via the broadcast interface 104. The controller reception unit 106 receives an instruction signal transmitted via an infrared ray or the like from a controller 105 that is operated by the user. The instruction signal thus received is then passed on to the control unit 101 via the bus 102.

The display 107 is a display device at which images of the program contents, generated by the display image generation unit 119, are displayed. At the display 107, the display images input via the display interface 108 are taken in and are brought up on display. The speaker 109 is an output device that outputs sound input thereto via the audio output interface 110.

The external input/output interface 111 connects the television tuner 100 with devices such as the digital recorder 130 and a digital video camera. Via the external input/output interface, images and sound output from the digital recorder 130, the video camera or the like are input or images and the like received at the television tuner 100 are output to an outside recipient.

The Internet communication interface 112 is used to communicate with the application distribution server 16 via the Internet 14. The home network communication interface 113, connected to the home network 12, is used to communicate with another device such as the digital recorder 130, connected to the home network 12.

The external device search unit 114 is a functional unit that searches via the home network communication interface 113 for another device, i.e., an external device, such as the digital recorder 130, connected in the home network 12. The external device search unit 114 in the embodiment executes an external device search in the home network 12, in response to a request transmitted from the application execution unit 117, which executes a universal device search application program and a device linkage application program. The external device search unit 114 receives information indicating the IP address, the device ID, the device name, the device category and the like, transmitted from an external device responding to the search request and stores the received information into the storage unit 120.

The application list acquisition unit 115 is a functional unit that obtains an application list (application list) provided by the application distribution server 16 via the Internet communication interface 112. When issuing a list acquisition request to the application distribution server 16, the application list acquisition unit 115 may also transmit information indicating requirements (such as the specific purpose of use of the application program, the category, the ID and the name of a corresponding linkage partner device and the like), based upon which application programs to be included in the list are to be selected so as to obtain an application list listing application programs meeting the specific requirements. In addition, the application list thus obtained may be stored into the storage unit 120 or the like.

The application acquisition unit 116 is a functional unit that obtains an application program from the application distribution server 16 via the Internet communication interface 112. The application acquisition unit 116 issuing an application acquisition request to the application distribution server 16 specifies the acquisition target application by its ID, name, category or the like. Once the desired application program is obtained, it stores the obtained application program into the storage unit 120 or the like.

The application execution unit 117 is a functional unit that loads therein and executes the device search application program or the device linkage application program having been obtained from the application distribution server 16 and stored into the storage unit 120. Once the application program is executed, the application program may be discarded from the storage unit 120 or it may be saved in the storage unit 120 following the application program execution.

The content reproduction unit 118 executes processing through which program contents received at the broadcast reception unit 103 are reproduced as images. The content reproduction unit 115 separates packets of the program contents having been received at the broadcast reception unit 103 via, for instance, an image distribution IP network, into different types of signals, e.g., an audio signal, an image signal and data, individually decodes the signals and then inputs the decoded signals to the display image generation unit 119 and the like.

The display image generation unit 119 generates display images to be brought up on display at the display 107 by using the image signal and the data signal having been decoded via the content reproduction unit 118 and various types of display data stored in the storage unit 120. The display image generation unit 119 in the embodiment obtains, for instance, information related to external devices, which is stored in the storage unit 120, and generates a device list screen listing the devices that have responded, to be brought up on display at the display 107. It also obtains from the storage unit 120 the application list having been obtained from the application distribution server 16 and generates a display image of the application list.

The storage unit 120 is a storage medium in which various types of data, including the application list obtained from the application distribution server 16 and device information transmitted from devices present on the home network 12 are stored. The storage unit 120 may be constituted with any of various types of storage media such as a semiconductor memory, an optical disc and a magnetic disk.

The television tuner 100 in the embodiment is structured as described above.

Embodiments of Linked Processing

Figure 3:
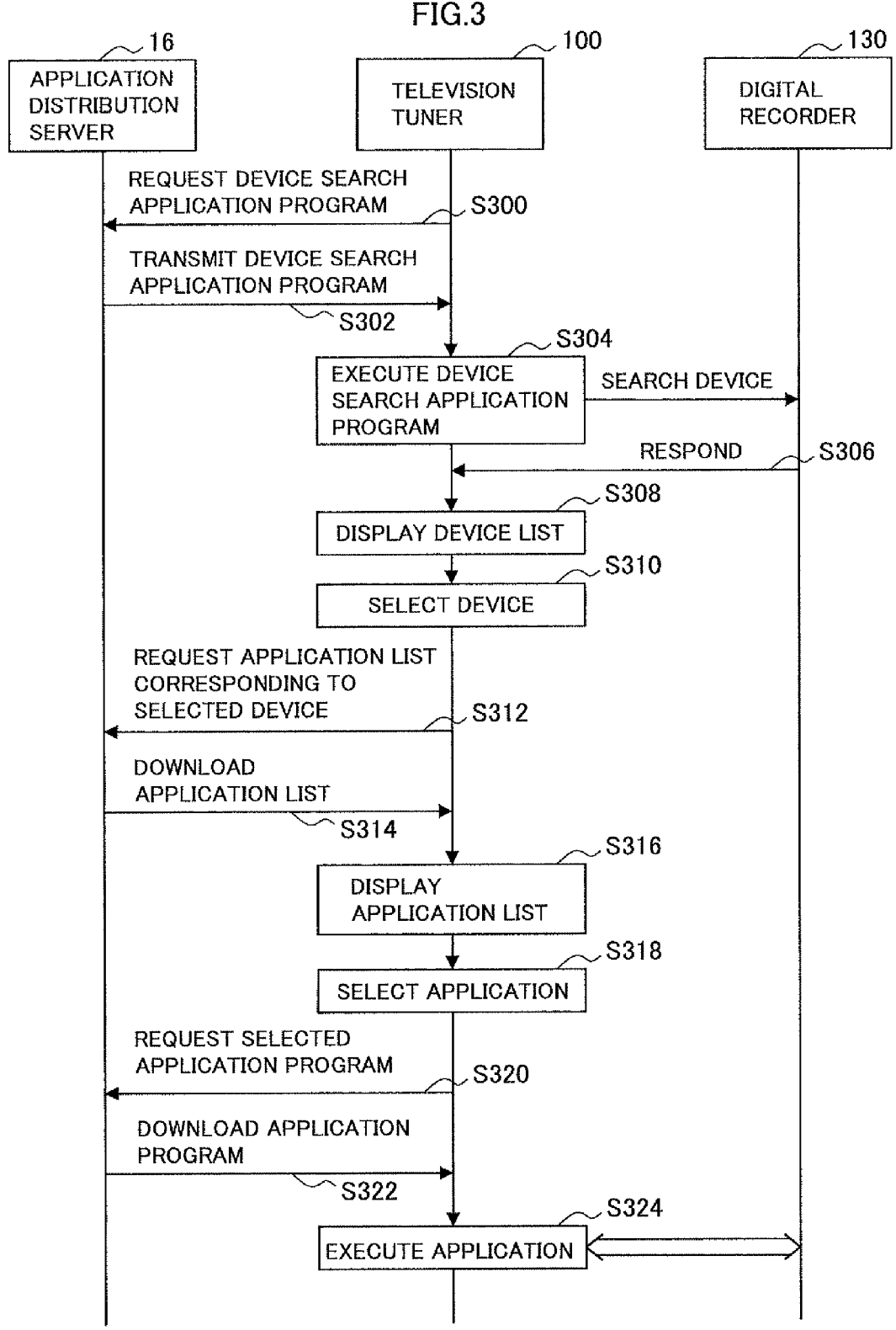
FIG. 3 presents a flowchart of the sequence of the device linked processing executed in a first embodiment of the present invention.
Figure 4:
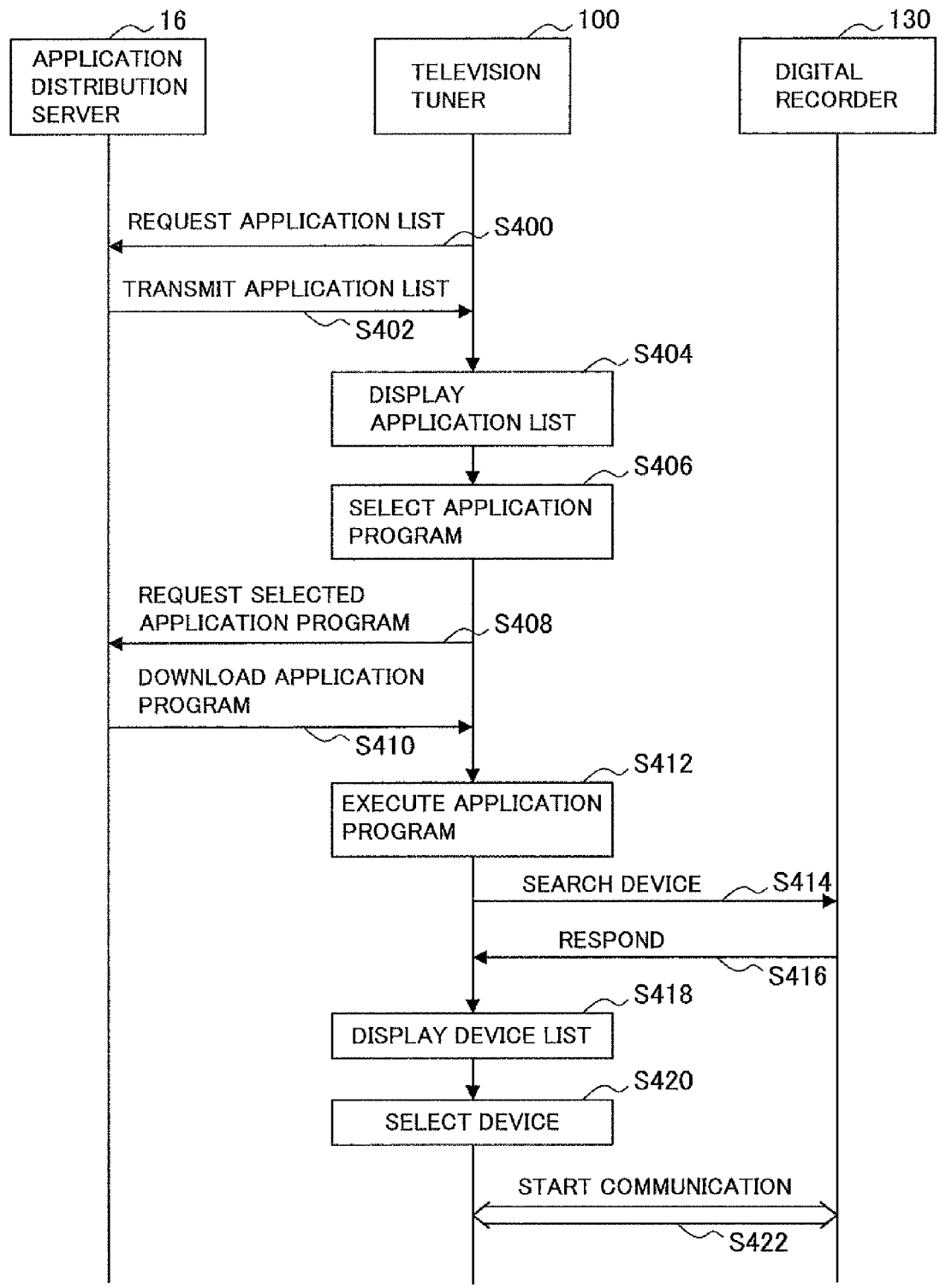
FIG. 4 presents a flowchart of the sequence of the device linked processing executed in a second embodiment of the present invention.

In reference to FIGS. 3 and 4, embodiments of the linked processing executed at the television tuner 100 and an external device such as the digital recorder 130 are described. FIG. 3 presents a flowchart of the sequence of the device linked processing executed in the CE device linkage system 10 in the first embodiment. FIG. 4 presents a flowchart of the sequence of the device linked processing executed in the CE device linkage system 10 in the second embodiment.

First Embodiment

First, in reference to FIG. 3, the linked processing executed in the CE device linkage system 10 in the first embodiment is described. In the embodiment, device linkage is achieved as the television tuner 100 searches for an external device within the home network 12 by using a universal device search application program downloaded from the application distribution server 16, downloads an application program corresponding to the external device found through the search from the application distribution server 16 and executes the downloaded application program. The following is a description of the flow of the linked processing executed in the embodiment given in reference to FIG. 3.

The external device search unit 114 of the television tuner 100 outputs a request for a universal device search application program to the application distribution server 16 (step S300). Upon receiving the request from the television tuner 100, the application distribution server 16 transmits the universal device search application program corresponding to the television tuner 100 to the television tuner 100 (step S302).

Next, the application execution unit 117 of the television tuner 100 executes the universal device search application program having been obtained from the application distribution server 16, enabling the external device search unit 114 to search for an external device present on the home network 12 through the function of the universal application program (step S304). In response to the search request issued from the television tuner 100, devices including the digital recorder 130 that are connected to the home network 12 and can thus link with the television tuner 100 each transmit information indicating the device IP address, the device ID, the device name, the device category and the like (step S306).

Figure 6:
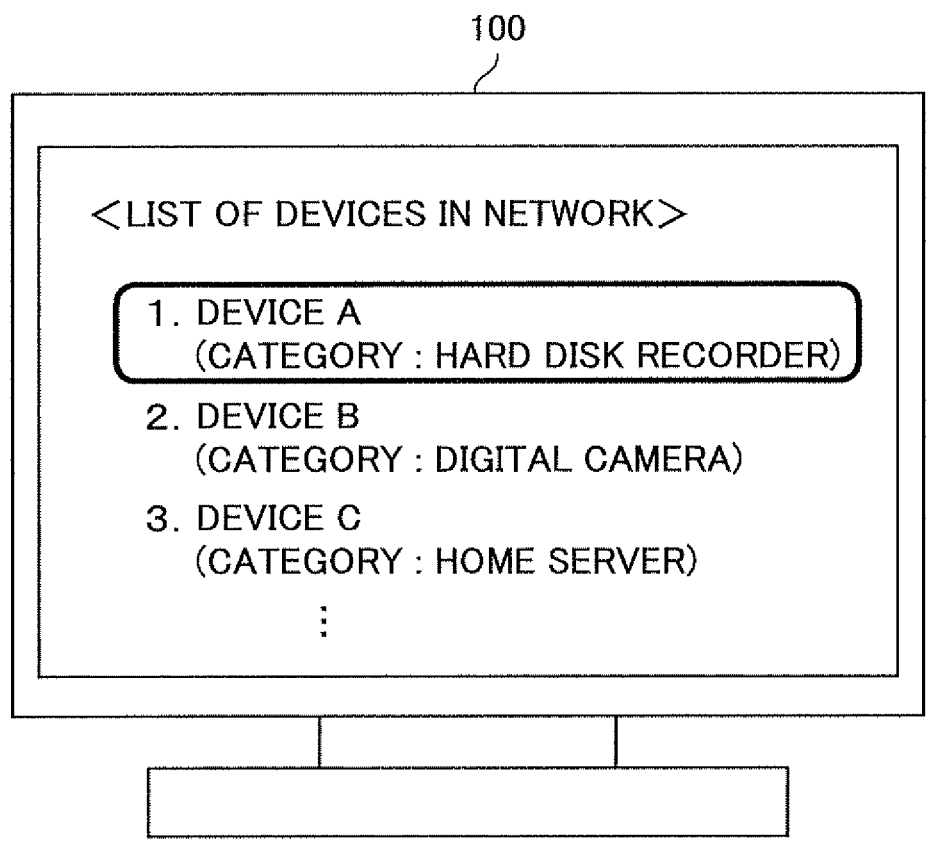
FIG. 6 presents an example of an application list screen that may be brought up on display.

The external device search unit 114 in the television tuner 100 stores the device information having been received via the home network communication interface 113 into the storage unit 120 or the like. The display image generation unit 119 then obtains the external device information stored in the storage unit 120, prepares a device list screen listing all the responding devices and displays the list at the display 107 (step S308). FIG. 6 presents an example of a device list screen that may be brought up at the display 107. The device categories, the device names and the like of all the devices that have responded to the request are listed on the screen. The user operates the controller 105 to select a device he wishes to engage in linked operation from the device list at the display 107 (step S310). Information indicating the selected device is transmitted from the controller reception unit 106 to the control unit 101.

The control unit 101 executes application list acquisition control by transmitting information indicating the device ID and the like of the device selected by the user to the application list acquisition unit 115. The application list acquisition unit 115, in turn, transmits the information indicating the device ID, the device name and the like of the selected device to the application distribution server 16 via the Internet 14 and requests a dedicated application list listing the dedicated application programs corresponding to the particular device (step S312). Upon receiving a request from the television tuner 100, the application distribution server 16 transmits the dedicated application list corresponding to the device indicated in the information having been transmitted from the television tuner 100 (step S314).

Figure 5:
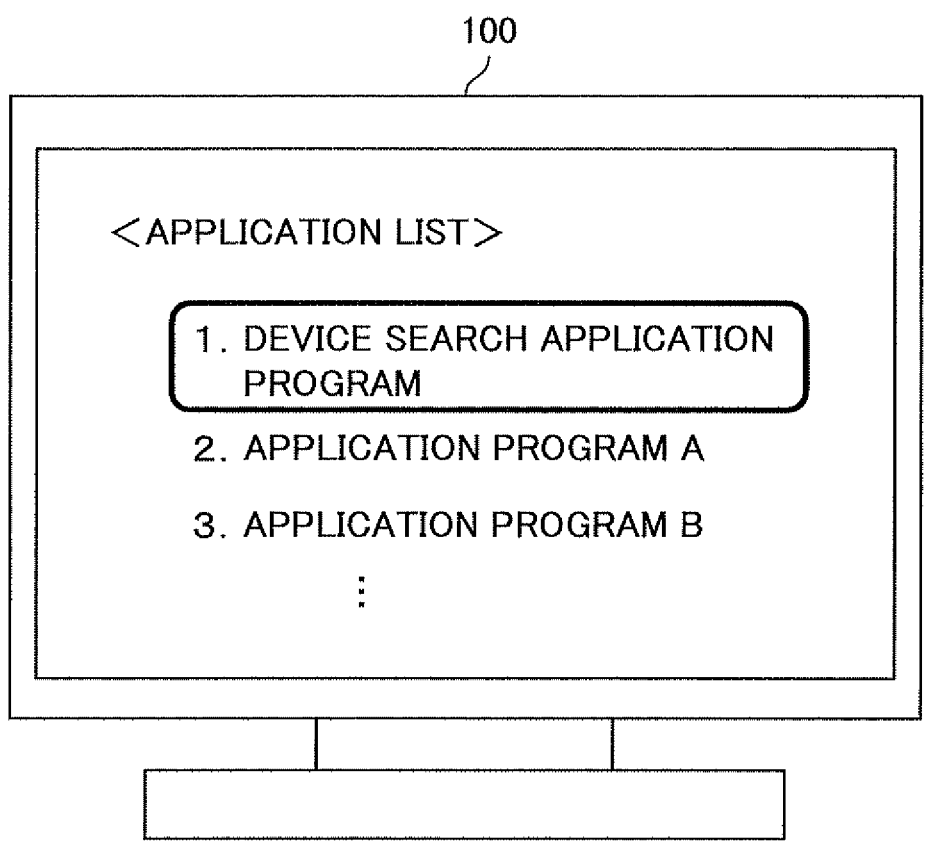
FIG. 5 presents an example of a device list screen that may be brought up on display.

The application list acquisition unit 115 stores the application list obtained from the application distribution server 16 into a memory or the like. The display image generation unit 119 prepares a linked application list screen based upon the application list stored in memory and displays the screen thus prepared at the display 107 (step S316). FIG. 5 presents an example of an application list screen that may be brought up on display at the display 107. As in step S314, the user operates the controller 105 to select a specific application program in the application list (step S318). Information indicating the selected application program is transmitted from the controller reception unit 106 to the control unit 101.

The control unit 101 executes control so as to download the selected application program by transmitting information indicating the ID or the like of the application program having been selected by the user to the application acquisition unit 116. The application acquisition unit 116, in turn, transmits the information indicating the ID, the name and the like of the selected application program to the application distribution server via the Internet 14 and requests application program acquisition (step S320).

Figure 7:
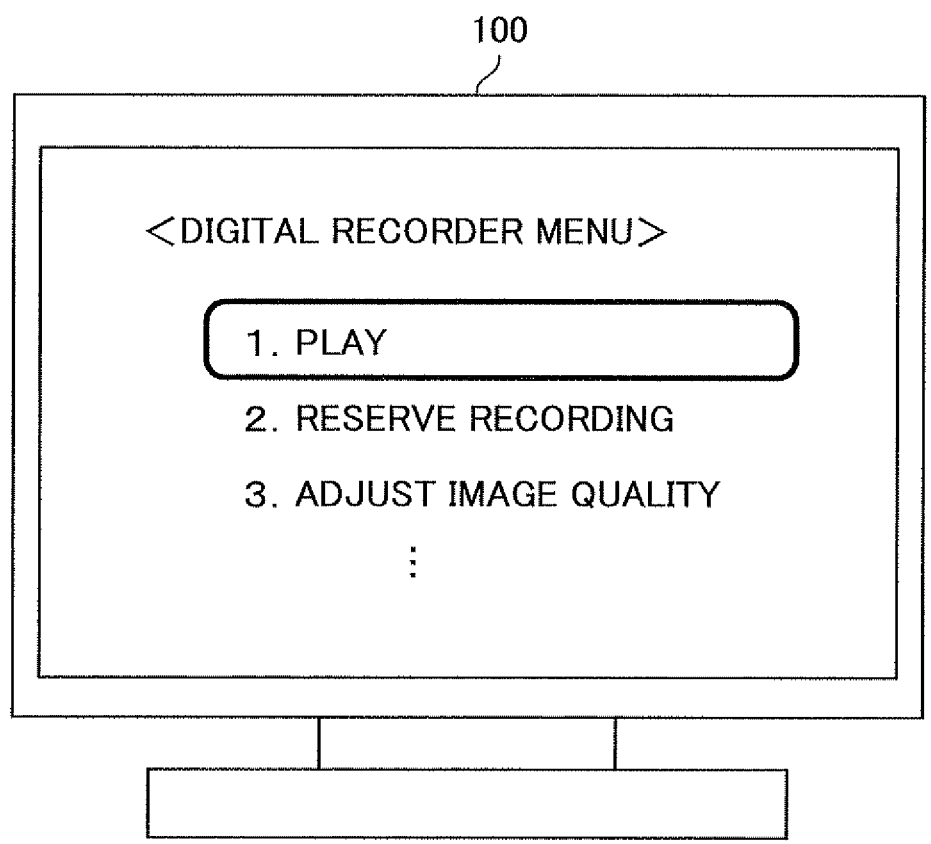
FIG. 7 presents an example of a screen that may be brought up on display while application program execution is in progress.

Upon receiving the application program acquisition request from the television tuner 100, the application distribution server 16 transmits the application program specified by the application ID or the like having been received to the television tuner 100 (step S322). At the television tuner 100, the application execution unit 117 executes the downloaded application program, thereby engaging a linkage function through linkage with the external device such as the digital recorder 130 (step S324). FIG. 7 presents an example of a screen that may be brought up at the display 107 while the application program execution is in progress.

It is to be noted that while the user first selects the linkage target device and then the application list corresponding to the device selected by the user is obtained in the embodiment, the present invention is not limited to this example. For instance, an application list listing the application programs corresponding to all the devices in the home network may be first obtained and stored into memory or the like. Then, once a specific device is selected, the applications corresponding to the particular device may be extracted from the list and indicated to the user.

As described above, the devices connected in the home network are listed through the processing executed based upon the device search application program and then, information indicating only the control application programs corresponding to the discovered devices are provided to the user. Thus, the user no longer needs to perform the tedious task of looking for the application program he wishes to use and, consequently, better convenience is assured. This feature is expected to prove increasingly advantageous in the future since many more devices will eventually be connected in the home network. Thus the number of application programs to be provided from the server is thus bound to increase and the user would not be able to readily select an application program corresponding to a specific device connected in the home network.

In addition, since the device search application program itself is also downloaded from the server, the user is able to select a specific device search method best suiting his needs. For instance, the user may specify a device launch period so as to execute a search with a preference for devices having been launched into the market during that particular period of time or he may indicate a specific function so as to execute a search with a preference for devices supporting the particular function. In short, the device search can be customized so as to respond to the specific needs of the user.

Second Embodiment

Next, in reference to FIG. 4, the linked processing executed in the CE device linkage system 10 in the second embodiment is described. In the embodiment, as an application program selected by the user from an application list is downloaded and executed, an external device corresponding to a particular application program is searched in the home network. The following is a description of the flow of the linked processing executed in the embodiment given in reference to FIG. 4.

First, the application list acquisition unit 115 in the television tuner 100 obtains an application list from the application distribution server 16 (step S400). The application list obtained in this step may include all the application programs available at the application distribution server 16 or application programs meeting specific requirements (e.g., purposes of use of application programs) may be short-listed in this application list.

The application distribution server 16, having received the application list acquisition request from the television tuner 100, transmits the application list (step S402). The application list acquisition unit 115 in the television tuner 100 stores the application list obtained from the application distribution server into the storage unit 120 or the like. The display image generation unit 119, in turn, obtains the application list stored in the storage unit 120 generates a display screen (see FIG. 5) to be brought up at the display 107 and displays the image thus generated (step S404).

The user operates the controller 105 to select a specific application program in the application list on display at the display 107 (step S406). Next, the application acquisition unit 116 in the television tuner 100 transmits to the application distribution server 16 information indicating the ID, the name and the like of the application program having been selected in step S406, and requests the selected application program (step S408).

In response to the application program acquisition request received from the television tuner 100, the application distribution server 16 transmits the application program matching the specified ID, name and the like to the television tuner 100 (step S410). At the television tuner 100, the application program transmitted from the application distribution server is stored into the storage unit 120 and the application execution unit 117 loads therein the program having been stored into the storage unit 120 and then executes the program (step S412).

Once the application program is started up, the external device search unit 114 searches for an external device on the home network 12 with a given timing (step S414). In response to the search request issued from the television tuner 100, devices connected in the home network 12, such as the digital recorder at 130, each transmits to the television tuner 100 information indicating the device IP address, the device ID, the device name, the device category and the like (step S416).

The external device search unit 114 in the television tuner 100 stores the device information having been received via the home network communication interface 113 into the storage unit 120 or the like. The display image generation unit 119 then obtains the external device information stored in the storage unit 120, prepares a device list screen (see FIG. 6) listing all the responding devices and displays the list at the display 107 (step S418).

The user operates the controller 105 to select a device he wishes to engage in linked operation from the device list at the display 107 (step S420). Information indicating the selected device is first received at the controller reception unit 106 and is then passed on to the application execution unit 117. The application execution unit 117, in turn, starts communicating with the device having been selected by the user so as to engage a linkage function through linkage with the device (step S422).

As described above, the user first specifies an application program and devices present on the home network are detected as the specified application program is executed in the embodiment. Thus, even when a user does not know which specific external device should be selected to achieve a linkage function that he wishes to engage, the function can be executed without the user first having to specify the external device. In other words, since the user does not need to know in advance which specific device corresponds to the function he wishes to engage, he will be able to find the target device with ease even when many more devices are eventually connected in the home network.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device capable of communicating with an external device connected thereto via a network, comprising:
   an application acquisition unit that obtains an application program to be used to control a function of said external device from an application distribution device present on said network; and
   an application execution unit that controls the function of said external device by executing said application program obtained by said application acquisition unit,
   wherein said application program obtained by said application acquisition unit includes a function of searching for said external device that causes execution of an external device search on said network.

2. An information processing method adopted in an information processing device capable of communicating with an external device connected thereto via a network and includes an application acquisition unit that obtains an application program to be used to control a function of said external device from an application distribution device present on said network and an application execution unit that controls a function of said external device by executing said application program obtained by said application acquisition unit, comprising:
- a step in which said application acquisition unit obtains an application program that includes a function of searching for an external device that causes execution of a search for an external device on said network;
- a step in which said application acquisition unit obtains from said application distribution device an application program to be used to control a function of said external device found through said search; and
- a step in which said application execution unit controls the function of said external device found by executing the obtained application program.

* * * * *